United States Patent [19]

Aiello et al.

[11] Patent Number: 6,014,323
[45] Date of Patent: Jan. 11, 2000

[54] MULTIPHASE POWER CONVERTER

[75] Inventors: Marc F. Aiello, Oakmont; Joseph M. Matesa, Jr., Murrysville; Peter W. Hammond, Greensburg, all of Pa.

[73] Assignee: Robicon Corporation, New Kensington, Pa.

[21] Appl. No.: 09/130,076

[22] Filed: Aug. 7, 1998

Related U.S. Application Data

[60] Provisional application No. 60/055,050, Aug. 8, 1997.

[51] Int. Cl.$^7$ ...................................................... H02M 7/00
[52] U.S. Cl. .............................. 363/71; 363/156; 323/361
[58] Field of Search ............................... 323/361; 363/71, 363/40, 64, 156

[56] References Cited

U.S. PATENT DOCUMENTS

| | | | |
|---|---|---|---|
| 5,005,115 | 4/1991 | Schauder | 363/159 |
| 5,594,636 | 1/1997 | Schauder | 363/160 |
| 5,625,545 | 4/1997 | Hammond | 363/71 |
| 5,764,499 | 6/1998 | Klug et al. | 363/39 |

OTHER PUBLICATIONS

IEEE article entitled "Displacement Angle Control of Matrix Converter," by Jun Oyama et al., Department of Mechanical Engineering and Computer Science, Nogasoki University, published in 1997 pp. 1–7.

*Primary Examiner*—Shawn Riley
*Attorney, Agent, or Firm*—Buchanan Ingersoll, P.C.

[57] ABSTRACT

An electrical power converter for an incoming AC transformer connected to a multiphase power source and having multiple secondary windings. Each secondary winding is connected to multiple switching cells, each of which functions like a matrix converter. The secondary windings can be either single or multi-phase and more than one transformer can be provided such that the multiple secondary windings can be distributed among individual transformers. The output of at least two of the switching cells are connected in series. The switching cells can be either bi-directional or unidirectional and can also have a three-phase input. A combination of IGBTs and diodes can form the switching cells.

23 Claims, 12 Drawing Sheets

FIG. 4a
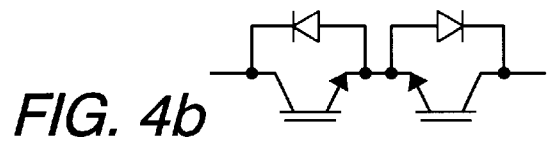
FIG. 4b
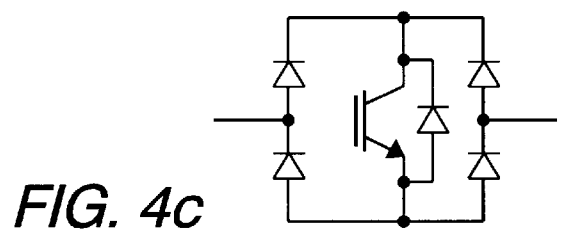
FIG. 4c
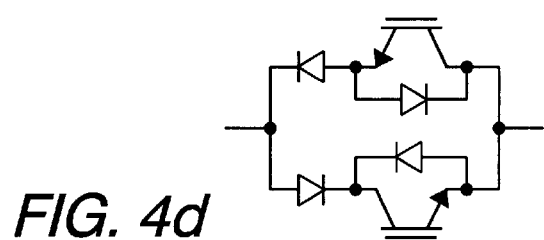
FIG. 4d
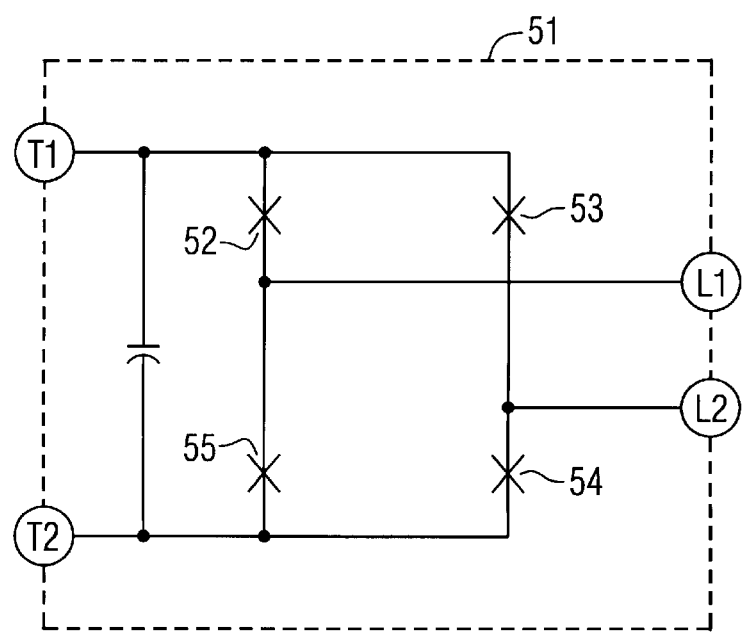
FIG. 5

0
MULTIPHASE POWER CONVERTER

CROSS REFERENCE TO RELATED APPLICATION

This application is based on U.S. Provisional Application Serial No. 60/055,050, filed Aug. 8, 1997.

BACKGROUND OF THE INVENTION

1. Field of the Invention

Solid-state medium-voltage power converters utilize semiconductor devices to convert a three-phase incoming power to an adjustable medium-voltage output. The outputs can be from multiphase AC or variable-voltage DC. Frequency or voltage control of the output is delivered to a load. The load can be either AC or DC, and, in certain drive applications, may be a multiphase AC motor. Because most solid-state converters use switching to obtain variable frequency and/or variable voltage outputs, harmonic considerations, both in the power line that feeds the drive and in the load, are of a high concern. It is desirable to limit the harmonics in both the line and load side or reduce the specific harmonic frequencies which are undesirable.

2. Description of the Prior Art

One such power converter is shown in U.S. Pat. No. 5,625,545, which is hereby incorporated herein by reference. This converter utilizes a multi-phase input transformer to feed a plurality of series-connected cells. Each series-connected cell includes an incoming rectifier section, which feeds a capacitor bank for storing energy from the rectifier output. The DC voltage from the capacitor is then converted to AC through the utilization of a solid-state inverter. This system provides a reduced harmonic supply in a medium-voltage drive which can be supplied to an AC load such as an AC motor. This topography requires that the energy delivered to the load pass sequentially through a transformer, a rectifier, smoothing capacitors and an inverter. Each of these components increases the cost of the overall system. If the converter uses a simple rectifier, no regeneration (four-quadrant operation) is provided. The use of the DC link also generally requires bulky electrolytic capacitors.

Matrix converters or cycloconverters have been proposed for usage in drive applications. Such matrix converters utilize an array of solid-state switches to sequentially connect the sinusoidally varying AC inputs to respective outputs. Such cycloconverters are limited in their output voltage because they eliminate the DC rectifier. In addition, because the matrix converter switches directly from the AC input to the output lines, the converter produces harmonics at both input and output. Individual solid-state switching devices may have lower voltage ratings than can usually accommodate medium-voltage applications. The cost of medium-voltage-rated solid-state switches can make utilization of matrix converters for medium-voltage applications undesirable. Matrix converters connected directly to the AC line have a limitation in the voltage output, in that the output voltage must relate to the phase-to-phase input voltage. Therefore, when matrix converters are connected to a standard AC line, they generally cannot produce a standard voltage level output that could be used with an existing standard AC motor.

The converter of the invention provides a converter capable of operating as a reduced-harmonic power supply or AC drive. It can provide full four-quadrant operation, permitting power regeneration from the load into the line. In many applications large electrolytic capacitors or bulky reactors may not be required. The output can be either AC or DC, and the voltage and/or frequency may be designed into the equipment to produce the desired output values, including standard motor voltages. Undesired harmonics on the primary and secondary may be significantly reduced. Depending on the application, when desired, the converter can provide power factor improvement.

SUMMARY OF THE INVENTION

The invention provides for an incoming AC transformer connected to a multi-phase power line and having a plurality of secondary windings. Each winding of the plurality of secondary windings can be either single phase or multi-phase, and some preferred embodiments will be a three-phase secondary winding. In some embodiments more than one transformer may be utilized such that the plurality of secondary windings are distributed among individual transformers. One such embodiment includes three transformers, each having a plurality of windings. It will be desirable for control and voltage blocking considerations that the plurality of secondary windings be spaced in phase from each other in some embodiments. Each of the windings is connected to a switching cell, which functions like a matrix converter. Some switching cells will be unidirectional for certain applications, such as, for example, DC outputs. Other switching cells will be bi-directional and can provide for bi-directional currents, which is specifically desirable in some applications of three-phase motor drives. At least two of the switching cells are connected in series. In the converter a series string of switching cells is connected across a load. Multiple strings of cells can be connected in parallel for DC applications. Where multiphase AC loads are desired, each phase of the output is comprised of a plurality of series-connected switching cells. Embodiments include three-phase secondaries feeding series-connected switching cells, each cell having three inputs and two output terminals. Combination of IGBT and diodes can form the switching cells.

BRIEF DESCRIPTION OF THE DRAWINGS

FIGS. 4a–d show the symbol for and some embodiments of specific bidirectional switch elements.

FIG. 5 is a diagrammatic representation of a bidirectional switching cell (2 input/2 output).

DESCRIPTION OF THE PREFERRED EMBODIMENTS

Figure 1:
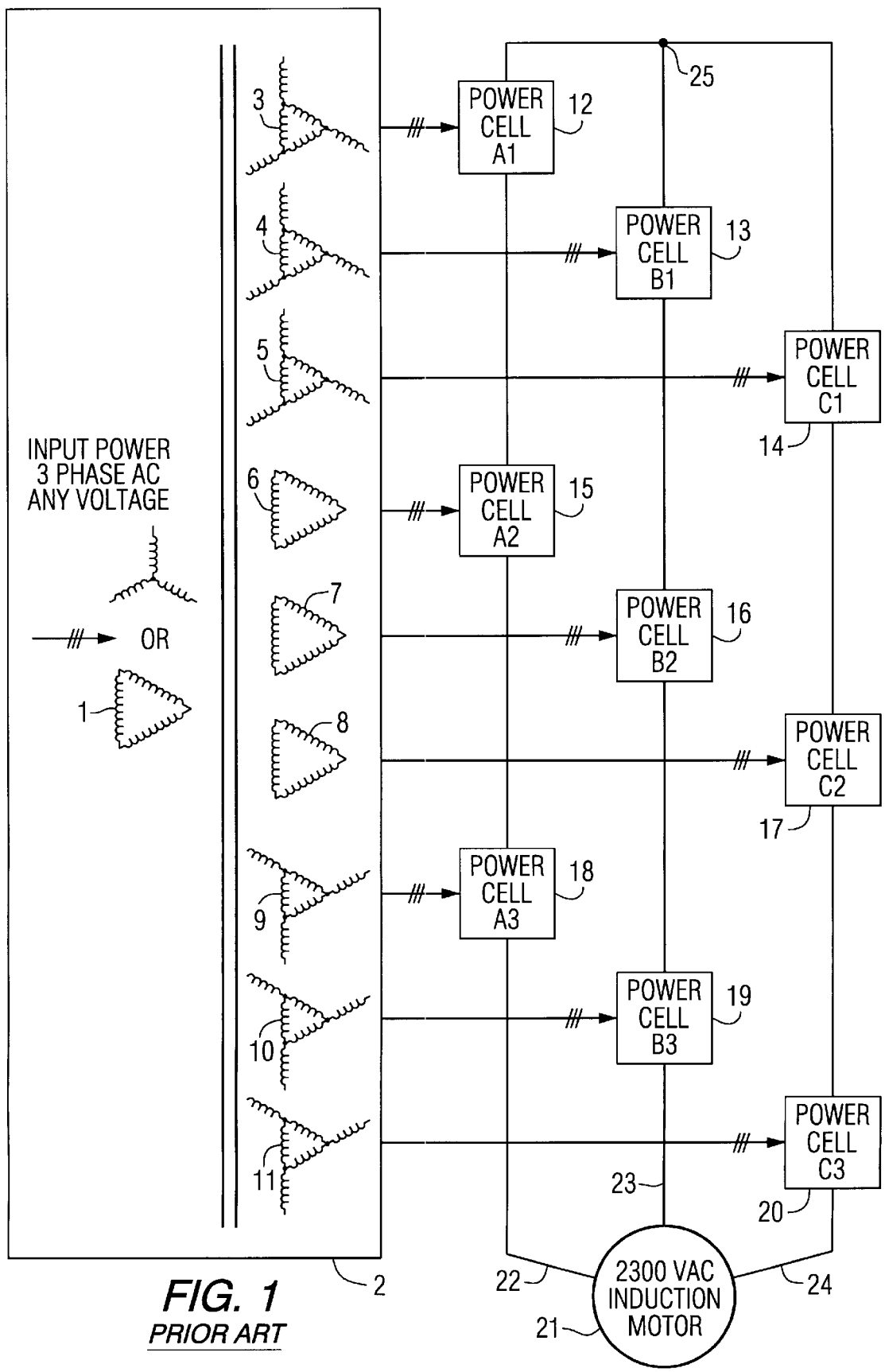
FIG. 1 is a diagram of a prior art drive using power cells each having a DC link, as shown in U.S. Pat. No. 5,645,545.

FIG. 1 shows a prior art device which utilizes a DC conversion section to provide DC power across a capacitor and inverter. Incoming line transformer 2 has its primary 1 connected to a three-phase line. Secondaries 3 through 11 are each connected to series-connected cells 12–20 which each include a DC rectifier section, a capacitor bank and a DC-to-AC inverter section. Outputs 22, 23 and 24 feed motor 21.

Figure 1A:
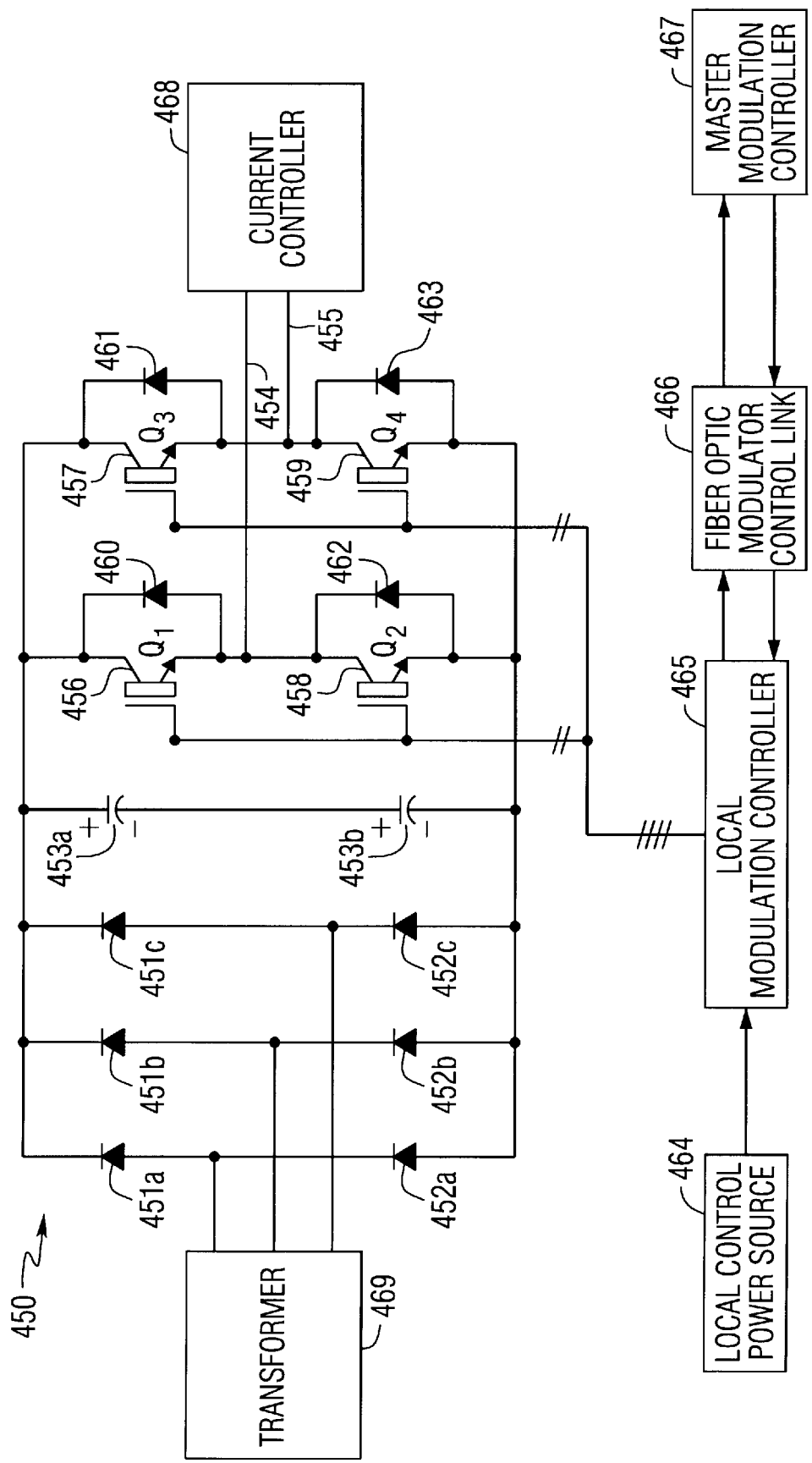
FIG. 1a is a schematic diagram representing a prior art power cell of the type shown in FIG. 1.

FIG. 1a is a schematic diagram of a prior art type power cell of the device shown in FIG. 1. Power cells 12–20, which is illustrated in FIG. 1a, converts three-phase AC power into a filtered DC power output diodes 451a–c and 452a–c. A three phase AC secondary winding circuit on the power transformer 469 feed the bridge.

Smoothing capacitors 453a, 453b store energy and act as a current smoothing filter. The DC power, thus conditioned, can be selectively supplied to output lines 454 and 455 using the PWM method by transistors 456 (Q1), 457 (Q3), 458 (Q2), and 459 (Q4) and diodes 460–463.

Power, in the form of pulse-width-modulated pulses, is delivered to load 468 via output lines 454m 455 transistor 58 (Q2). Likewise, power is delivered to a second phase output line segment 55 by a connection between the emitter of transistor 57 (Q3) and the collector of transistor 59 (Q4).

Transistors 56 through 59 can receive controlling signals from local modulation controller 65 through suitable isolation means. Such controller 65 may be typified by Fuji part number EXB841, although other gating controllers may be used. Isolation may be provided by fiber-optic means. Controller 65 selects either of transistor 56 (Q1) or 58 (Q2) to be ON, and either of transistor 57 (Q3) or 59 (Q4) to be ON, which will permit power to pass to a load 68 by way of the first phase output line segment 54 or the second phase output line segment 55, respectively. Fiber-optic modulator control links 66 can be used to electrically isolate all circuits in any one cell from all circuits in any other cell, and to reduce electromagnetic interference effects which may be imposed between local controller 65 and master modulation controller 67. Local modulation controller 65 can receive power from local control power source 64 which may be electrically connected to secondary winding circuit input 69.

The power cells 450 employ voltage-source topology, where the combination of power cells 450 determine the phase voltage, but the load determines the current. Accordingly, it is preferred to provide a current path at all times between phase output line segments 454 and 455 because (1) other cells in series with cell 50 may be producing a non-zero voltage across output line segments 454 and 455 when cell 450 is at ZERO volts, and (2) inductive loads such as induction motors demand a continuous path for current flow. Therefore, the method for controlling the operational state of power cell 50 includes controlling the transistors 456 through 459, such that each power cell 50 conducts current at a predetermined voltage, with a predetermined polarity, and for a predetermined pulse duration.

Figure 2:
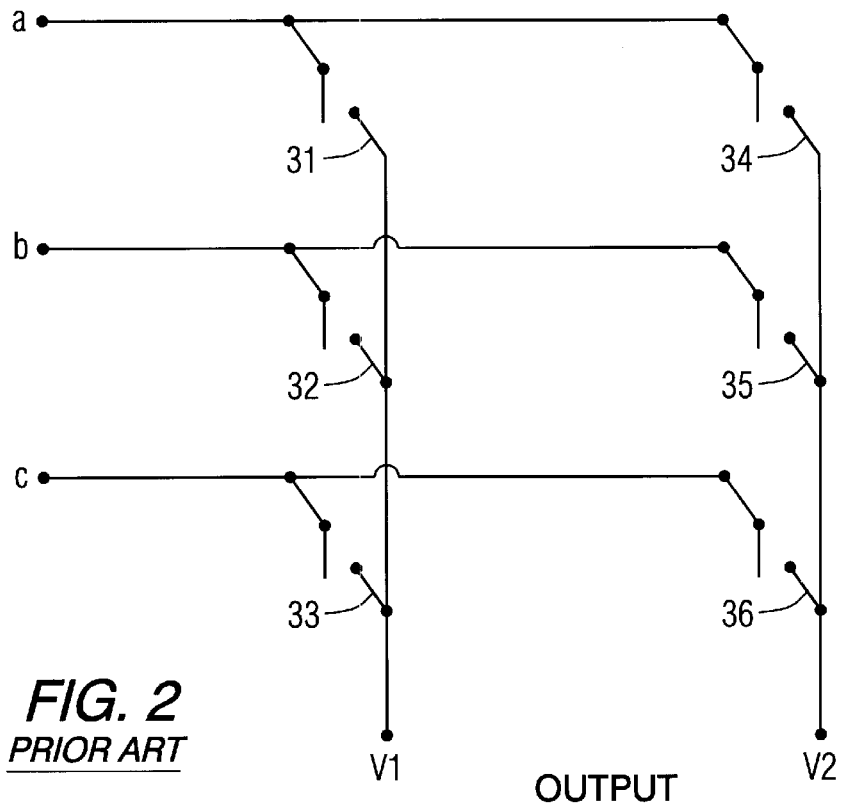
FIG. 2 is a schematic diagram representing a matrix converter (3 input/2 output).

FIG. 2 shows a diagrammatic representation of a simple matrix or cycloconverter. A three-phase AC line has inputs (a), (b), (c). Each of these lines can be connected to either of the output lines V1 or V2. Input line (a) can be connected to V1 output via switch element 31, or to V2 by switch element 34. Similarly, input line (b) can be connected to V1 via switch element 32 or to output V2 by switch element 35. Input line (c) can be connected to either output V1 or V2 by respective switch elements 33 and 36. By selectively switching the switch elements 31–36, output voltage and frequency at V1–V2 may be controlled. The output voltage available between V1 and V2 at any time can be chosen from any available voltage between input lines (a), (b) and (c) at that given time. The switch elements 31–36 are usually semiconductor devices which can be triggered or gated in a pattern or sequence as known in the art to provide the desired voltage at V1 and V2. The matrix converter of FIG. 2 is limited in its output voltage to the envelope of voltages that are available from the three-phase input line. This will be understood by those knowledgeable with regard to the converter art. The switching elements 31–36 are never connected in a sequence which could provide a short-circuit between any of the three-phase incoming lines (a), (b) or (c).

Figure 3:
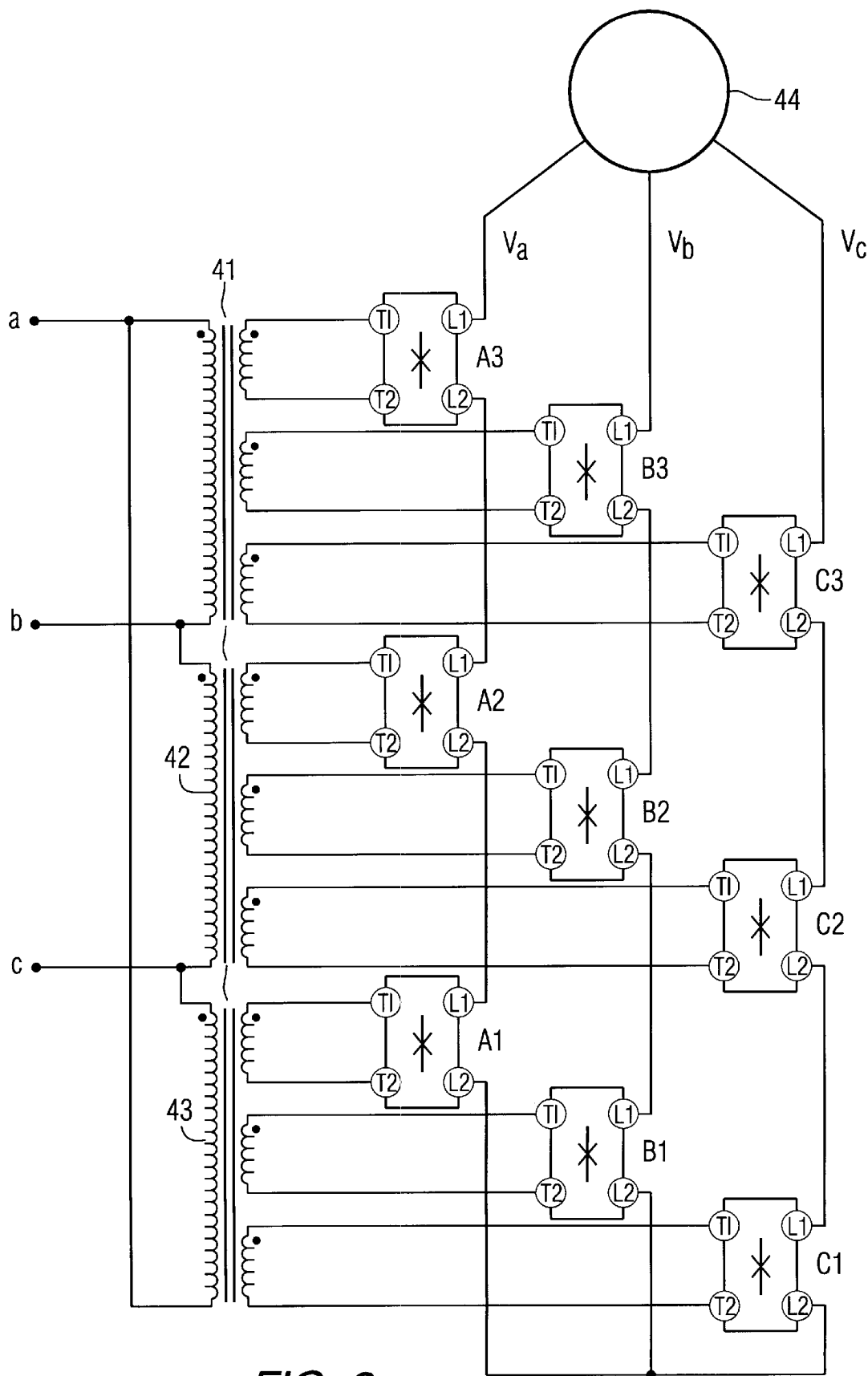
FIG. 3 is a diagrammatic representation of an embodiment of the invention for providing a four-quadrant variable-frequency AC drive.

Referring now to FIG. 3 there is shown one embodiment of the invention which can be utilized to provide a three-phase AC motor drive. A three-phase incoming power is supplied to incoming lines (a), (b) and (c). This three-phase AC input is fed to three transformers 41, 42 and 43. As shown, three individual transformers are used in this embodiment (41, 42 and 43). However, it will be understood that a single transformer can be used in other embodiments and in certain applications may be desirable. The relative cost of three transformers versus a single transformer functioning the same as 41, 42 and 43 can be a consideration in the selection of a single or multiple transformer use. Transformer 41 has three single-phase output windings, each feeding a switching cell (A3, B3 and C3). As shown, switching cells A1-3, B1-3 and C1-3 are shown as bi-directional cells. In some embodiments of the invention, unidirectional cells may be utilized. Each of the switching cells A1-3, B1-3 and C1-3 contain a matrix switching arrangement. As shown in FIG. 3, switching cells A1, A2 and A3 are connected to respective secondary windings of transformers 43, 42 and 41. Similarly, switching cells B1, B2 and B3 are respectively connected to transformer secondary windings on transformers 43, 42 and 41. Likewise, a third AC output leg utilizes series-connected switching cells C1, C2 and C3 which are respectively connected to secondary windings on transformers 43, 42 and 41. Each of the series-connected switching cells A1, A2 and A3 can be independently controlled to produce an individual output voltage which is then summed through their series connection to provide current to output line $V_a$ to motor 44. Similarly, the voltage available at any given time through the series connection of B1, B2, B3 provides current to output line $V_b$, which is fed to motor 44. In like manner, switching cells C1, C2 and C3 feed output line $V_c$. Because an incoming line transformer 41 is utilized, a wide range of individual output voltages are available in respectively connected switching cells based upon the specific secondary voltage available. The maximum available output voltage from any given cell such as A3 can be chosen through appropriate transformer 41 so as not to be limited by the incoming line voltage between (a)–(b). While matrix converter applications previously have been limited to the specific switching element voltage rating, the embodiment shown in FIG. 3 can provide a higher output voltage between respective output lines $V_a$, $V_b$ and $V_c$ than the individual rating on the switching elements in any given switching cell (A1-3, B1-3, C1-3). In addition, because multiple cells are connected in series, harmonic reduction at the input and output can be achieved through appropriate triggering of the switching within each cell and from cell to cell. Such switching is similar to that shown and described in U.S. Pat. No. 5,625,545, and that patent is hereby incorporated by reference. To further provide harmonic reduction, the phase of the transformer 41, 42, 43 secondaries may be varied from each other.

FIG. 5 shows a diagrammatic representation of a switching cell 51, such as those shown in FIG. 3. It will be understood that in multiple-cell converter arrangements, it will be desirable to use identical cells throughout. The cell 51 shown in FIG. 5 can be constructed as a subassembly in the overall converter or drive arrangement. It may use a separate heat-sink and input and output buss connections that are compatible with modular construction. Inputs T1 and T2 are connected to a single-phase AC source, such as that shown on the secondary of the transformers in FIG. 3. Controlled switching of the individual switch elements 52–55 provide various current paths to outputs L1 and L2. In addition, selected continuity by switching bi-directional switch elements 52–55 permit a zero voltage between outputs 11–12. The zero state of the switch cell 51 acts as if outputs L1 and L2 were directly connected. This provides for series current in each output leg, as shown in FIG. 3. By closure of switch elements 52 and 54, a current path can be established from input T1 through switch element 52 to output terminal L1, and from output L2 through switching element 54 to input T2. Similarly, current paths can be established between T1 to L2 and from L1 to T2 through bi-directional switch elements 53 and 55. While the switching cell 51 has been shown with bi-directional switch elements 52–54, it is to be understood that similar 2×2 (i.e., two input terminals to two output terminals) can be utilized with unidirectional switching elements corresponding to 52–54.

FIG. 4 shows symbolic and diagrammatic representations of bi-directional switching elements which may be used in cells such as 51, shown in FIG. 5. FIG. 4a shows the symbolic representation of a bi-directional switch. Any bi-directional switch can be utilized, however, semiconductor switching is desirable because of the need to have high-speed switching occur. FIG. 4b shows a bi-directional switch utilizing two series-connected IGBTs. Most commercially available IGBTs have internal reverse shunting diodes arranged in inverse series, as shown. Each IGBT can be controlled to either an "off" or an "on" state. In operation, when a given IGBT is conducting, the respective diode in the other IGBT provides a shunt path around the other IGBT. As a result, by respectively controlling either one or the other IGBT as shown in FIG. 4b, bi-directional switching is achieved. While the switch elements shown in FIG. 4 and in other embodiments are usually fast switching devices compared to 60 cycle current, they have some small transition period. In the "on" state these devices may have a very low resistance and impedance, such as for example less than 2 ohms. In the "off" state the elements have a high resistance, such as for example greater than 1000 ohms. During the transition period from "on" to "off" the resistance changes from low to high and from high to low when transferring from "off" to "on". Because the transition period is a very small part of the cycle, the switch utilized in this invention will be considered to be ideal, with only an "on" or "off" state, recognizing that an inconsequential transition state may exist in some actual switch elements. This is only one embodiment of a bi-directional switch that can be utilized. It will be understood that the invention includes other switch-element arrangements, both bi-directional and uni-directional.

FIG. 4c shows an embodiment of a bi-directional switch element utilizing one IGBT within a diode bridge arrangement. This embodiment may be desirable where the cost of the four external diodes in the bridge is less than the additional IGBT, as shown in FIG. 4b. Diodes act as pole switching elements to permit the functioning of the single IGBT to conduct current in either direction through the switching element.

Another embodiment of a bi-directional switching element is shown in FIG. 4d, in which two IGBTs are used in inverse parallel arrangements with reverse polarities. Two respective blocking diodes are utilized to prevent back flow of current when it is not desirable for that specific IGBT to be conducting. Any of the embodiments shown in FIG. 4 could be utilized along with other bi-directional switching arrangements in the switching cell 51 or other switching cells in the invention.

Figure 7:
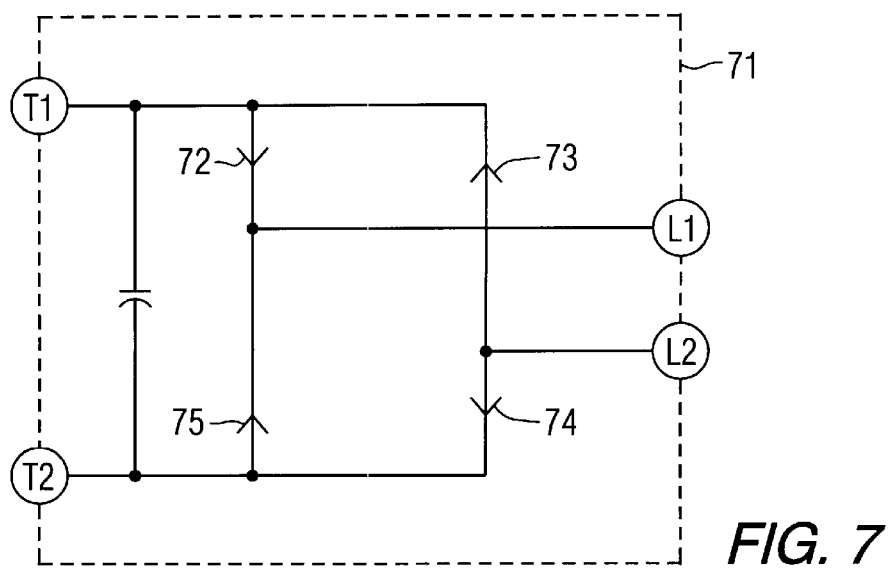
FIG. 7 is a diagrammatic representation of a unidirectional switching cell (2 input /2 output).

As has been described previously, bi-directional switching cells or unidirectional switching cells may be utilized. FIG. 7 shows an arrangement of a unidirectional switching cell 71. The switching cell 71 acts similarly to that shown in FIG. 5 at reference 51, except current flow is unidirectional, as shown. Current flow is always out of output terminal L1 and into output terminal L2. For many applications such as DC loads, the unidirectional switching cell will be adequate and can result in a significant cost savings. Individual switching elements 72 through 74, as utilized in the switching cell 71, are unidirectional switch elements.

Figure 6A:
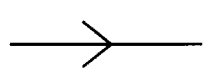
FIGS. 6a–b show the symbol for and some embodiments of a unidirectional switch element.
Figure 6B:
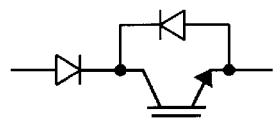

FIG. 6 shows a symbolic and a diagrammatic representation for such a unidirectional switch element. It is to be understood that other embodiments of unidirectional switch elements may be utilized in practicing the invention. FIG. 6a shows the symbolic representation for a unidirectional switching element. FIG. 6b shows a diagrammatic representation of one embodiment that may be utilized as a unidirectional switch element such as those utilized in FIG. 7, 72–74. FIG. 6b shows a single IGBT with a series reverse-blocking diode. Current can be conducted in one direction through the IGBT, with back currents blocked by the external diode shown. While specific switching elements described in this invention utilize IGBTs and diodes, it is to be understood that other devices, including other solid-state or semiconductor devices, can be utilized to accomplish the same switching function.

Figure 8:
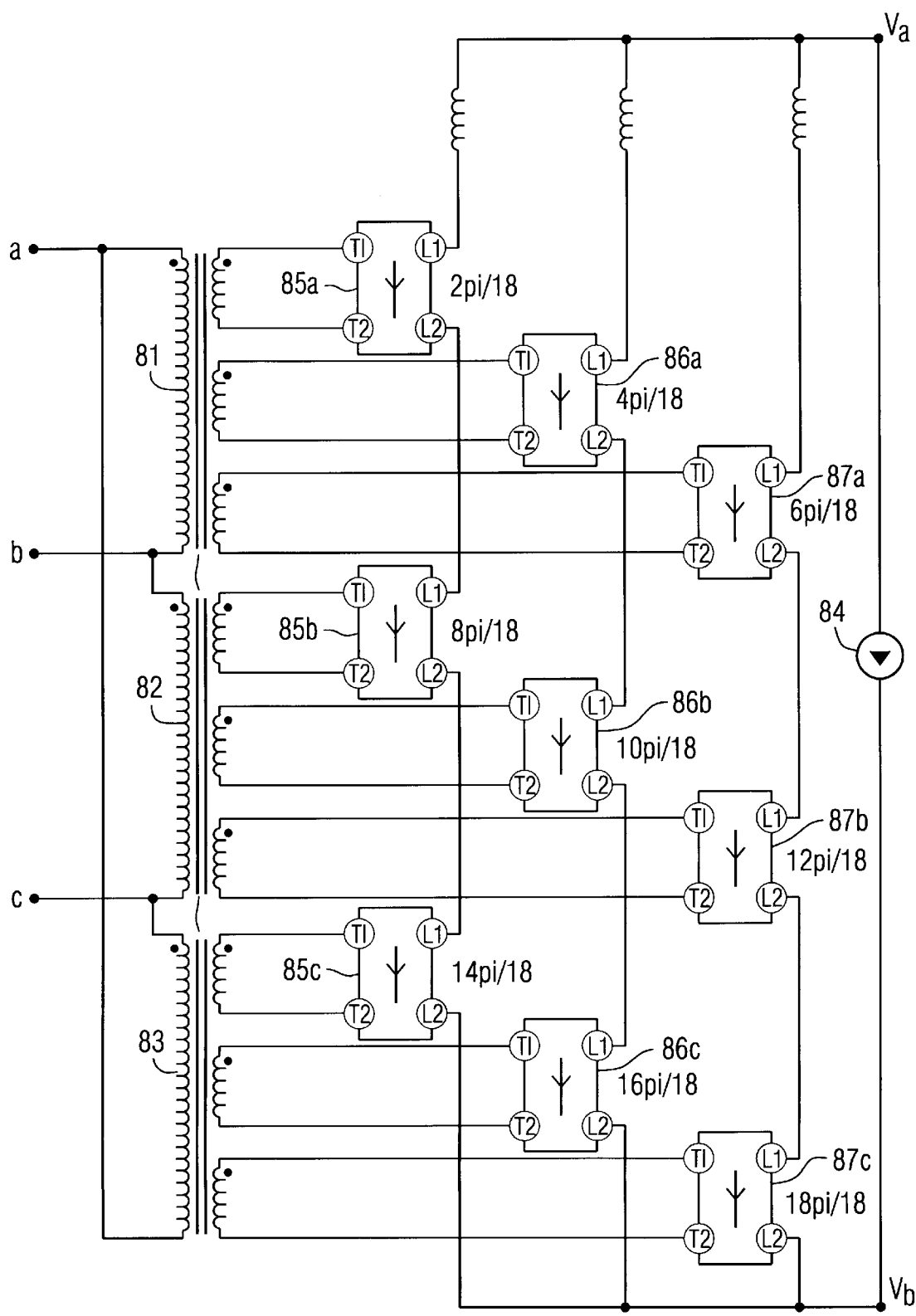
FIG. 8 shows an embodiment of the invention providing a DC output.

FIG. 8 shows a DC converter embodiment in which a three-phase input line is connected at (a), (b) and (c). The DC output is shown to a load 84 across terminals $V_a$, $V_b$. Three input transformers are shown, 81, 82 and 83. However, it is to be understood that a single input transformer equivalent to 81, 82 and 83 can also be utilized. Each transformer such as 81 has three secondary windings, each feeding a switching cell. Transformer 81 has three secondary windings, each connected to a single-phase input switching cell, 85*a*, 86*a*, 87*a*. Similarly, transformer 82 has three secondary windings, each connected to a single-phase input switching cell 85*b*, 86*b* and 87*b*. Likewise, transformer 83 has three secondary windings, each connected to a unidirectional switching cell 85*c*, 86*c* and 87*c*. In some applications the secondary windings may be sequentially spaced from each other. As shown, switching cells 85*a, b* and *c* are series connected to provide an output. Similarly, switching cells 86*a, b* and *c* are also connected in a series arrangement. Likewise, switching cells 87*a, b* and *c* are also connected in a series arrangement. As shown in FIG. 8, these series strings of switching cells are connected in parallel through a set of inductances, to provide greater total current to the load than could be provided by any single string of cells. The inductances support momentary differences is total output voltage from the various series strings.

Other embodiments could be utilized where the switching cells 85, 86 and 87 are bidirectional to provide four quadrant outputs and AC outputs. Similarly, the transformer secondaries could be phase shifted from each other or shifted within a group to provide improved harmonics.

Figure 9:
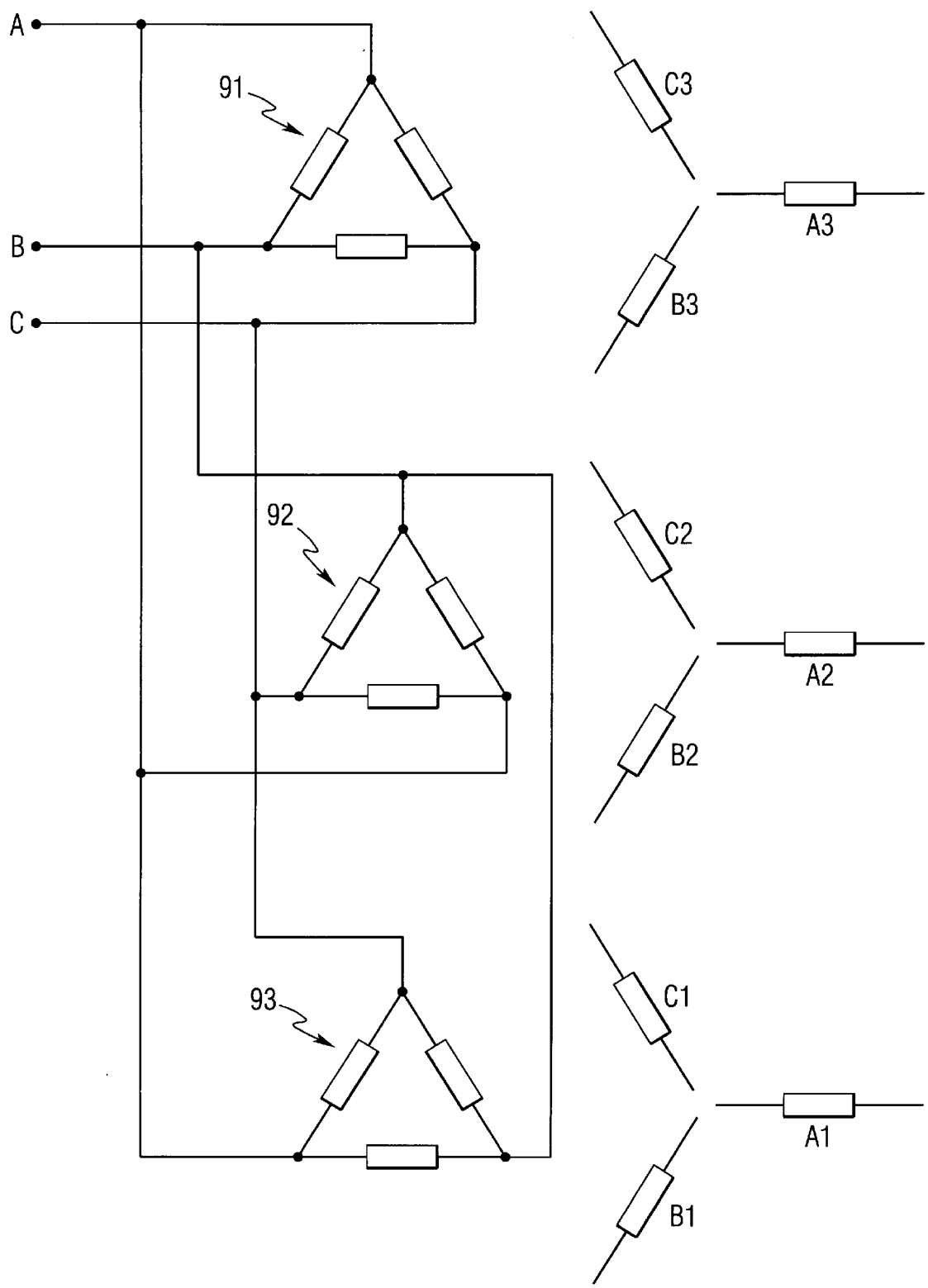
FIG. 9 is a diagrammatic representation of a transformer that may be used in embodiments of the invention with switching cells connected as shown in FIG. 3.
Figure 10A:
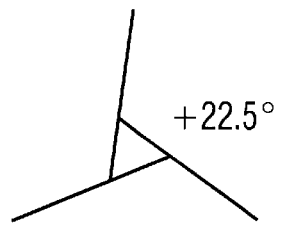
FIGS. 10a–h show transformer phase diagrams for other embodiments of the invention.
Figure 10B:
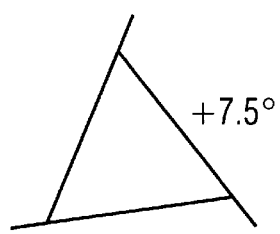
Figure 10C:
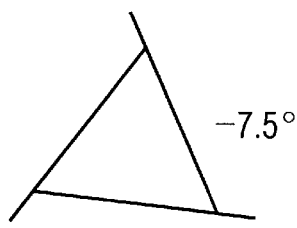
Figure 10D:
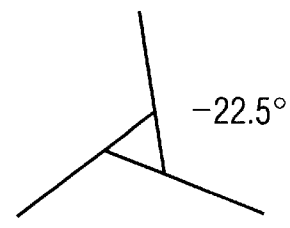
Figure 10E:
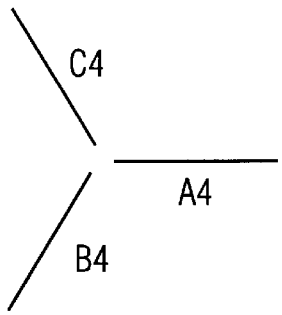
Figure 10F:
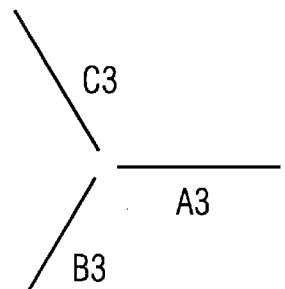
Figure 10G:
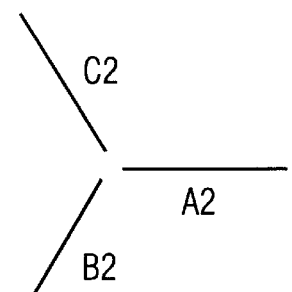
Figure 10H:
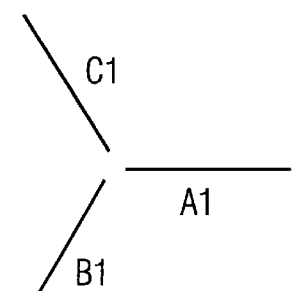

FIG. 9 shows a phase diagram for a transformer arrangement similar to that shown in FIG. 8 or other embodiments. While the switching cells shown in the previous drawings have all had single-phase inputs, it is also possible to use switching cells having three-phase inputs. Switching cells similar to those shown in FIGS. 5 and 7 can utilize a three-phase input. In such embodiments the bridge circuits will have three input lines and an additional set of switching elements connecting the additional input line to the outputs. FIG. 9 shows a transformer arrangement to operate with such input switching cells. The embodiment shown in FIG. 9 could use such single-phase input, two-terminal output (2×2) arrangement. FIG. 9 shows three sets of primary windings 91, 92 and 93, with respective secondary windings A1-3, B1-3, C1-3. Secondary windings A1-3, B1-3 and C1-3 are connected to respective three-phase switching cells such as shown in FIGS. 5 or 7. Similarly, the transformer shown in FIG. 9 could also be utilized with a unidirectional switching cell converter such as shown in FIG. 8.

FIG. 10 shows a transformer arrangement for utilization in a 12 switching cell embodiment. FIGS. 10*a–d* show the input extended-delta connection for the transformer(s) primaries. Diagrams 10*e–h* show respective output transformer secondary phase arrangements. Such arrangements of transformer windings could be utilized with either unidirectional or bi-directional switching cells.

Figure 11:
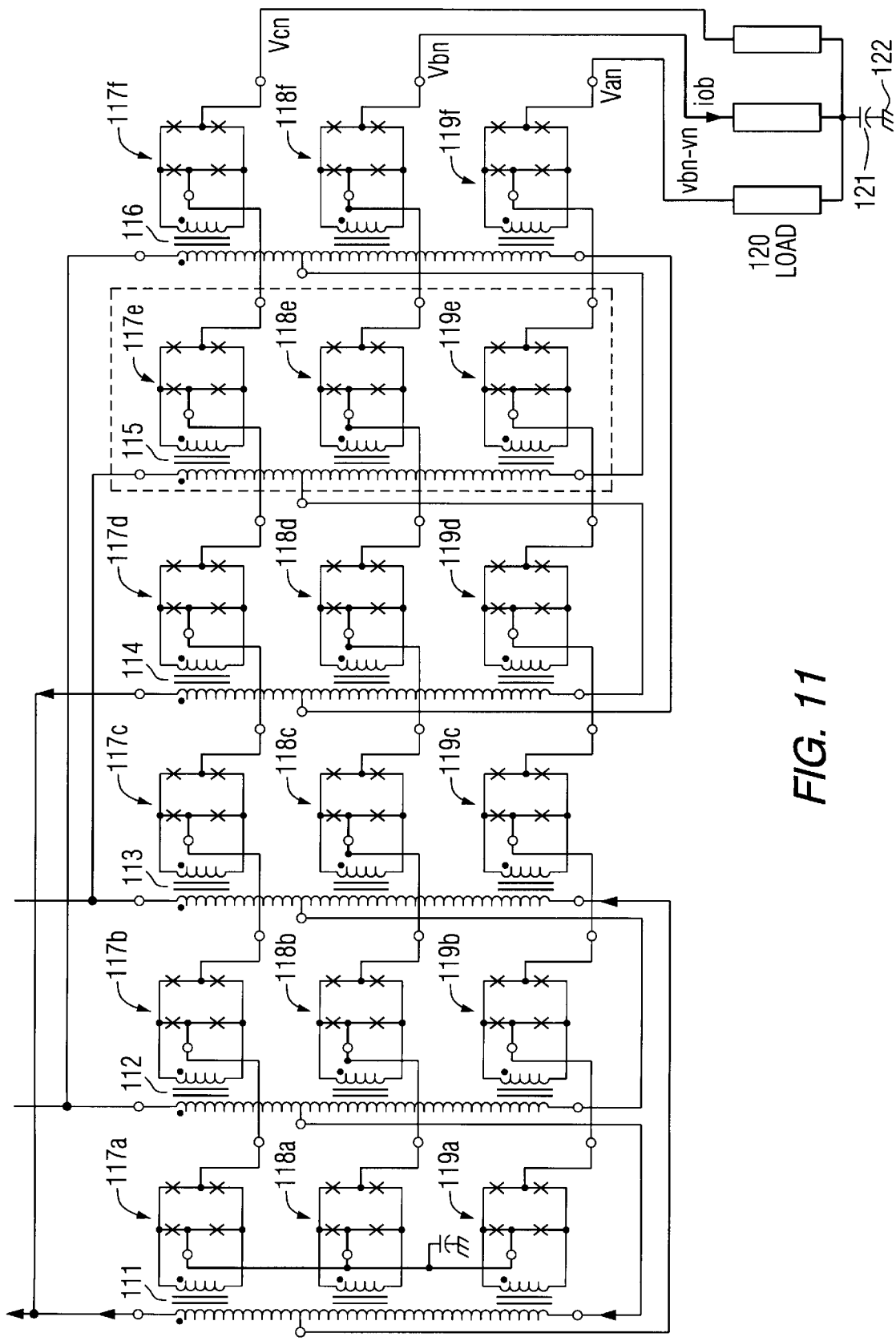
FIG. 11 is a diagrammatic representation of an embodiment of the invention providing a three-phase output with six switching cells in series in each leg.

FIG. 11 shows an embodiment utilizing six single phase tapped transformers, 111–116. Each transformer has three single phase output windings which are connected to three respective switching converters, 117*a–f*, 118*a–f* or 119*a–f*. Switching cells 117*a–f* are connected in series to an output $V_{cn}$. Similarly, switching cells 118*a–f* are connected in series to output $V_{bn}$. Likewise, converters 119*a–f* are connected in series to output $V_{an}$. As shown, a three-phase load, 120, is connected across the outputs $V_{an}$–$V_{cn}$. The common connection of the outputs of cells 117*a*, 118*a* and 119*a* may be grounded, and the ground may include a blocking capacitor, as shown. Similarly, the neutral connection on the load, 120, may be connected to ground 122 through capacitor 121. While the switching cells 117, 118 and 119 shown in FIG. 11 utilize bi-directional switch elements, it is to be understood that unidirectional switch elements may also be utilized in practicing the invention.

Figure 12A:
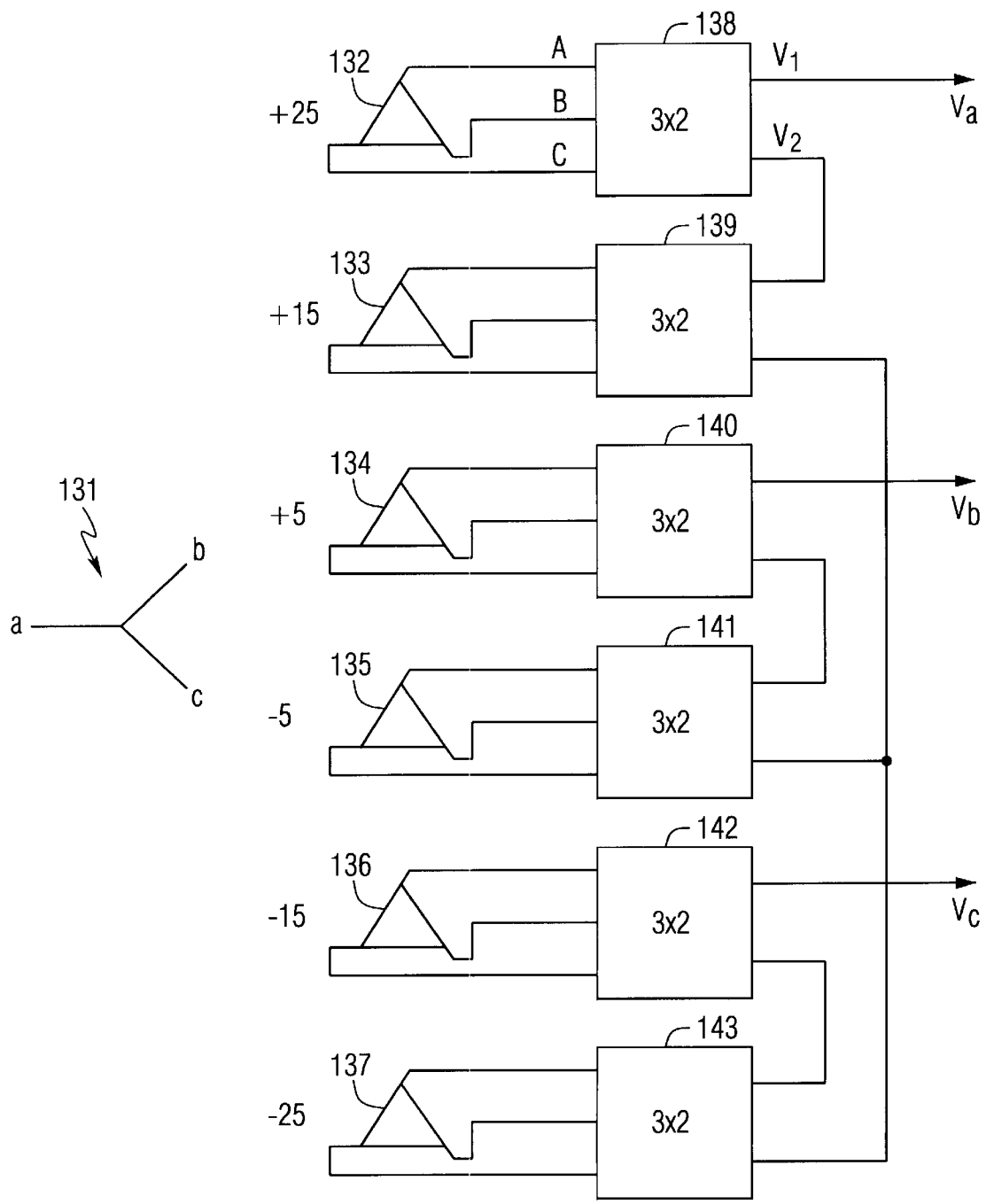
FIG. 12a shows an embodiment providing AC output utilizing two 3×2 cells in each output leg.
Figure 12B:
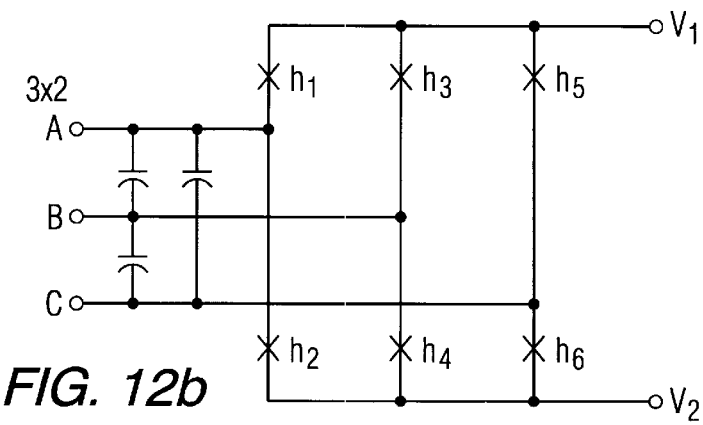
FIG. 12b shows a schematic of a bidirectional output cell.

FIG. 12A shows an embodiment utilizing an input transformer winding having a phase relationship shown at 131. Inputs a, b and c are from a three-phase AC power source. Similarly, secondary windings 132–137 are utilized. As shown, each secondary winding is displaced 5° from other respective windings. Secondary windings 132–137 have respective outputs A, B and C which are connected into 3×2 switching converters 138–143. The 3×2 switching converters 138–143 have a three-phase input and a two-terminal output. Bi-directional and unidirectional switch cells are shown in FIGS. 12*b* and *c*, respectively. The output of the switching cells 138–143 form a three-phase output to $V_a$, $V_b$ and $V_c$. Cells 138 and 139 are connected in series, to form one output leg to $V_a$. Similarly, switching cells 140 and 141 are connected in series to provide an output leg to $V_b$. Likewise, switching cells 142 and 143 are connected in series to provide an output to $V_c$. While FIG. 12 shows two 3×2 cells connected in series, it is to be understood that other numbers of cells can also be connected in series. Presently preferred embodiments would include three, four, five and six cells connected in series. Other numbers of cells may be connected in series to provide specific outputs to a given application.

FIG. 12*b* shows a 3×2 cell having a three-phase input at A, B and C. Switching elements h1–h6 control the output voltage available to $V_1$–$V_2$. Switching elements h1–h6 are bi-directional elements, and the output voltage between $V_1$ and $V_2$ can be four quadrant, including regenerative. Switch firing can be such as shown in U.S. Pat. No. 5,625,425.

While the switching cell of FIG. 12*b* is capable of independently connecting each output (v1 and v2) to any of its three inputs (a,b, or c), one class of switching strategies restricts the switch operation so as to connect each output to either the most positive of the three inputs, or the most negative of the three inputs. This class of switching strategies will be called "envelope mode," since the magnitude of the net output voltage of the cell |v1–v2| at any instant in time is either zero or the maximum phase-to-phase voltage appearing between the inputs. The use of "envelope mode" switching is desirable from the standpoint of control complexity, since this scheme includes fewer switch states than the general case. Further, "envelope mode" switching does not sacrifice voltage output capability compared to the general case, since the maximum input voltage is always among the control options.

Figure 12C:
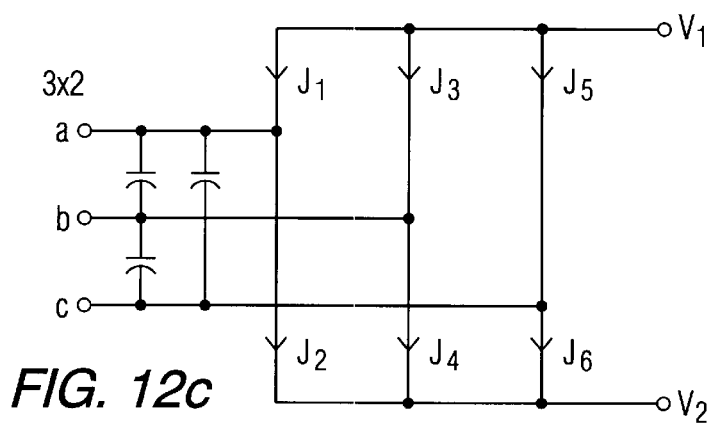
FIG. 12c shows a schematic of a unidirectional output cell.

FIG. 12*c* shows a 3×2 switching cell having inputs A, B and C from a three-phase transformer. Switching elements j1–j6 are unidirectional switching elements, as has previously been discussed. Controlled switching of elements j1–j6 results in a unidirectional current available at $V_1$–$V_2$.

In some of the embodiments, certain preferred transformers will be advantageous for some applications. In practice it is desirable for all degrees of matrix converters that the harmonic quality of the input currents is sufficiently good to minimize induced voltage due to inductive source reactance.

Unwanted harmonic currents induced in each of the phase shifted secondary windings of the multiphase transformer supplying the 3×2 matrix cells can be reduced or made to cancel more effectively at the primary windings, if the coupling between all secondary windings is maximized. Doing so can minimize the induced voltage.

A maximum or highly coupled secondary means that the flux generated as a result of currents in any given secondary winding couples in total to all adjacent secondary windings. This feature is controlled by proper transformer design.

If all outputs of an individual switching cell are connected to the same input of that cell, then no substantial current flows in the corresponding secondary windings of the transformer. Otherwise, the load current, which flows through the outputs of each switching cell, will also flow through one or more of the corresponding secondary windings of the transformer. Hence, in the course of various switching operations, the current in any secondary winding of the transformer may be periodically interrupted and re-established. Since every real transformer has some flux leakage, the process of interrupting or re-establishing current in the secondary windings will result in voltage transients, as is well understood in the power electronics industry. Further, it is desirable to include flux leakage between the primary and all of the secondary windings, to reduce the flow of harmonic current into the primary windings.

Figure 13:
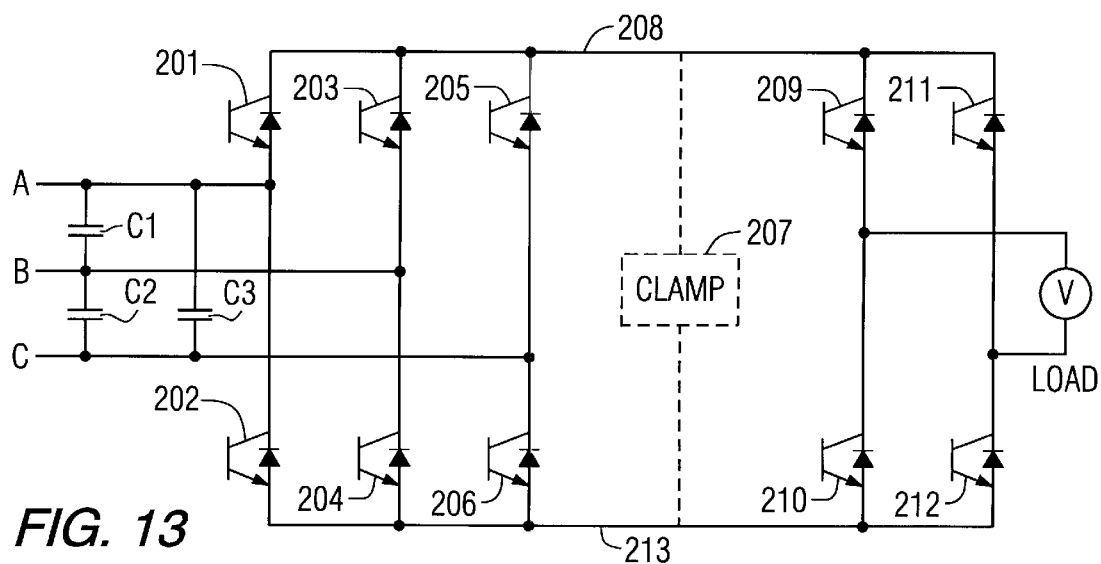
FIG. 13 shows an embodiment of a 3×2 switching cell providing bi-directional power flow using uni-directional switch elements.

One well-known method for mitigating such voltage transients is by the addition of shunting capacitors, such as c1,c2 and c3 as shown in FIG. 13. However, the addition of such capacitors is known to form a resonant circuit with the leakage reactance of the transformer, which may be excited by the switching of current by the converter. The severity of the entire problem can be reduced by "close-coupling" the secondary windings of one cell, with those of one or more other cells. That is, by constructing the transformer so as to minimize the flux leakage between the secondary windings that supply different cells. For instance, if a transformer had five percent per unit leakage in the primary, but only one percent per unit leakage between secondary windings, the transient voltage problem would be approximately one fifth as severe as if the transformer had one percent leakage on the primary side, and five percent leakage on the secondary side. While one cell is in process of switching, any other cell that is not in process of switching provides a repository for trapped energy, via the inter-secondary leakage. Thus, it is desirable to minimize this inter-secondary leakage.

FIG. 13 shows another 3-input, 2-output switching cell that can provide envelope mode operation (only). This cell includes a first switch set (201 through 206) which functions to connect intermediate nodes 208 and 213 independently to any of its inputs (a,b, or c). In this regard, the first switch set is one embodiment of the 3×2 converter with unidirectional switching elements, shown generically in FIG. 12c. However, FIG. 13 adds a second switch set (209 through 212), which functions to connect each of the cell's outputs individually to either of the intermediate nodes. Since each intermediate node is connected by some switch from the first switch set to at least one of the inputs, and since each output is connected by some switch from the second switch set to one of the intermediate nodes, then each output is connected by a pair of switches (one from the second switch set and one from the first switch set) to at least one of the inputs. This embodiment is desirable over known embodiments of the circuit of FIG. 12b when envelope mode operation is chosen, because by present technology, ten unidirectional switches are generally more economical than six bi-directional switches. The switches of FIG. 13 have the ability to conduct current in two directions, and to block voltage in only on direction. The intermediate nodes 208 and 213 have non-reversing polarity of voltage with respect to each other. This provides a convenient means of connecting a voltage clamp, such as a zener diode or any typical snubber, should such a clamp be desired because of transient conditions during switching.

Figure 14:
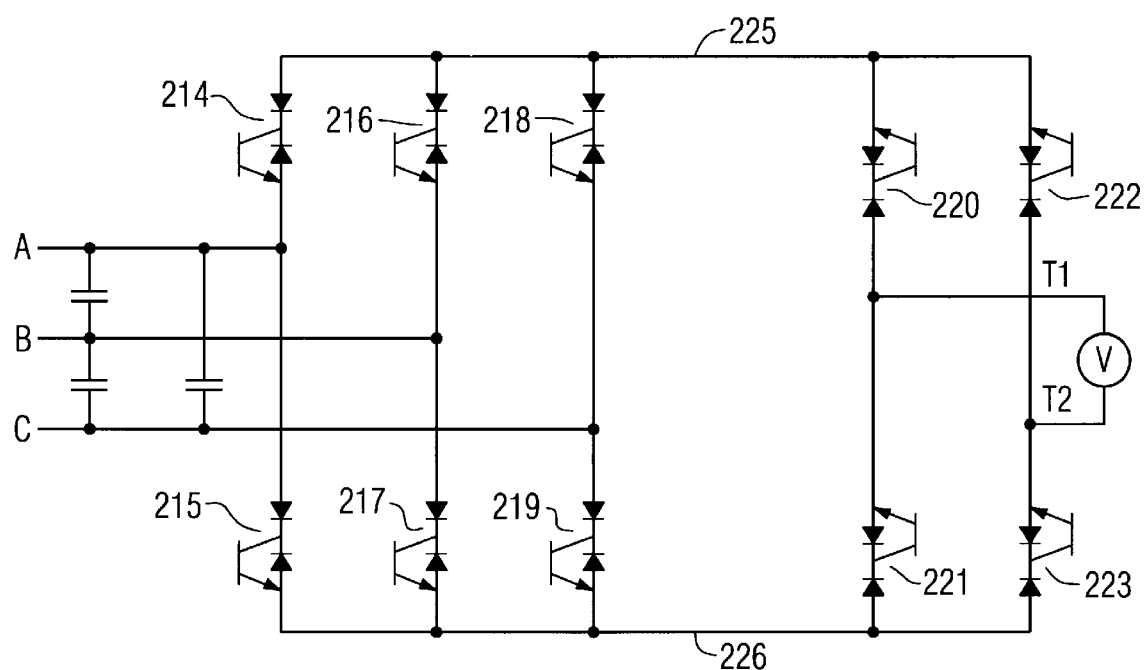
FIG. 14 shows another embodiment of a 3×2 switching cell providing bi-directional power flow using uni-directional switch elements.

FIG. 14 shows another 3-input, 2-output switching cell that is not limited to envelope mode operation. This cell includes a first switch set (214 through 219) which functions to connect intermediate nodes 225 and 226 independently to any of its inputs (a,b, or c). In this regard, the first switch set is one embodiment of the 3×2 converter with unidirectional switching elements, shown generically in FIG. 12c. However, FIG. 14 adds a second switch set (220 through 223), which functions to connect each of the cell's outputs individually to either of the intermediate nodes. Since each intermediate node is connected by some switch from the first switch set to at least one of the inputs, and since each output is connected by some switch from the second switch set to one of the intermediate nodes, then each output is connected by a pair of switches (one from the second switch set and one from the first switch set) to at least one of the inputs. This embodiment is desirable over known embodiments of the circuit of FIG. 12b, because by present technology, ten unidirectional switches are generally more economical than six bi-directional switches. The switches of FIG. 14 have the ability to block voltage in two directions, and to conduct current in only on direction. The intermediate nodes 208 and 213 each carry a non-reversing polarity of current.

While certain embodiments have been shown and described, it is understood that other embodiments consistent with the claims can be utilized in practicing the invention. While certain switching arrangements and switch cells have been described in detail, it is to be understood that other components may be utilized to provide the switching function of the invention.

We claim:

1. An electrical power supply for operation from a multiphase input comprising:
   a. at least one transformer connected to said multiphase AC source;
   b. said at least one transformer having a plurality of secondary windings each having three phases;
   c. at least one of said plurality of secondary windings being spaced in phase relationship from others of said plurality of secondary windings;
   d. a plurality of switching cells connected to respective ones of said plurality of secondary windings;
   e. each of said plurality of switching cells having outputs;
   f. said plurality of said switching cells configured such that each of said outputs is electrically connected to at least one of said three phases of respective ones of said plurality of secondary windings; and
   g. at least one of said plurality of switching cells having respective ones of said outputs serially connected to at least one output of another of said plurality of said switching cells.

2. The electrical power supply of claim 1 wherein at least one of said plurality of said switching cells is a matrix converter.

3. The electrical power supply of claim 1 wherein said plurality of three phase secondary windings are highly coupled to each other.

4. The electrical converter of claim 1 further comprising said plurality of switching cells being bi-directional.

5. The electrical converter of claim 4 wherein said bi-directional switching cell utilizes two series-connected IGBTs.

6. The electrical converter of claim 4 wherein said bi-directional switching cell utilizing one IGBT within a diode bridge arrangement.

7. The electrical converter of claim 4 wherein said bi-directional switching cell utilizes two IGBTs connected in an inverse parallel arrangement with reverse polarities.

8. The electrical converter of claim 1 further comprising said plurality of switching cells being unidirectional.

9. The electrical converter of claim 8 wherein said unidirectional switching cell utilizes one IGBT with a series reverse-blocking diode.

10. The electrical power supply of claim 1 wherein said plurality of switching cells further comprises each of said plurality of switching cells having a three phase input and a single phase output.

11. The electrical power supply of claim 10 wherein said single phase output is single phase AC.

12. The electrical power supply of claim 10 wherein said single phase output has unidirectional current flow.

13. The electrical power supply of claim 10 wherein at least one of said plurality of switching cells is bi-directional providing regenerative operation.

14. The electrical power supply of claim 1 wherein said plurality of switching cells are operated to provide said plurality of outputs of said plurality of said switching cells from selected ones of the highest and lowest voltage of said three phases of said plurality of phase secondary windings.

15. The electrical power supply of claim 14 wherein said plurality of switching cells further comprises each of said plurality of switching cells having a three phase input and a single phase output.

16. The electrical power supply of claim 15 wherein said plurality of said switching cells have a first switch set supplying a pair of intermediate nodes, each of said pair of intermediate nodes being in electrical connection with at least one of said three phases of respective ones of said plurality of three phase secondary windings; said plurality of said switching cells each having a second switch set and each of said outputs of said second switch set being in electrical connection with said intermediate nodes of the respective one of said switch cells.

17. The electrical power supply of claim 16 wherein said first and second switch sets comprise switch devices having characteristics to conduct bi-directional current and block voltage in a single direction.

18. The electrical power supply of claim 16 wherein said first and second switch sets comprise switch devices having characteristics to block voltage in two directions and conduct current flow in a single direction.

19. The electrical converter of claim 1 further comprising said at least one switching cells having serially connected outputs being three switching cells having serially connected outputs.

20. The electrical converter of claim 1 further comprising said at least one switching cells having serially connected outputs being at least one of three, four and five switching cells having serially connected outputs.

21. The electrical converter of claim 1 further comprising said at least two switching cells having serially connected outputs having an output line to a three-phase load.

22. The electrical converter of claim 1 further comprising said plurality of secondary windings being coupled to a single transformer primary.

23. The electrical converter of claim 1 further comprising said plurality of secondary windings being coupled to a plurality of individual transformer primaries.

* * * * *